United States Patent Office 3,321,438
Patented May 23, 1967

3,321,438
PROCESS FOR PREPARING FLUIDIZED BED COATING COMPOSITIONS CONTAINING POLYEPOXIDES AND AMINE CURING AGENTS
David W. Brooker, Slough, William V. Wilkinson, Ashford, Middlesex, and Alexander McIntosh, Addlestone, near Weybridge, Surrey, England, assignors to Shell Oil Company, New York, N.Y., a corporation of Delaware
No Drawing. Filed July 22, 1963, Ser. No. 296,492
Claims priority, application Great Britain, July 24, 1962, 28,440/62
5 Claims. (Cl. 260—47)

This invention relates to a resin coating composition. More particularly, this invention relates to a polyepoxide resin composition which is especially suitable for application in fluidized bed processes.

Specifically, the invention provides a process for preparing low-temperature curable, partially reacted polyepoxide resin compositions which comprises reacting at a temperature between 5° C. and 25° C. a polyepoxide having vic-epoxy equivalency greater than 1.0 and which is a liquid above 15° C. with at least 0.6 the stoichiometric amount of a curing agent selected from the group consisting of aliphatic amines and piperazines under conditions so that the rise in temperature during the reaction is not more than 10° C. The invention further provides a process for coating articles in a fluidized bed process wherein the above-noted composition is employed. Such curable compositions are particularly suitable for use in a process for coating an article wherein the article, preferably heated to a temperature above 80° C., is first dipped into a fluidized bed of particles of the new coating compositions of this invention, then removed from the bed, and the coating on said article cured by heating it preferably to a temperature of at least 80° C.

Recently, the fluidized bed technique has been used for coating articles with polyepoxide compositions. In this technique the polyepoxide- and curing agent-containing compositions have usually had to be heated to at least 150° C. Hitherto this process could not be used when, because of the nature of the article, heating to temperatures above 150° C. was not possible. Certain polyepoxide-containing compositions have now been discovered which cure at much lower temperatures, and which can therefore be used for coating this type of article by the fluidized bed technique.

Accordingly, the principal object of the present invention is to provide a polyepoxide coating composition which has a low curing temperature for use in a fluidized bed coating process wherein high temperatures are either impossible or undesirable. Other objects will become apparent to those skilled in the art from the following disclosure.

The polyepoxide or mixture of polyepoxides having an epoxy equivalency greater than 1.0, is preferably one or more liquid grades of epoxy resin; but mixtures of various grades can be used, some of which are solid at temperatures above 15° C., provided the mixture is liquid at temperatures above 15° C., i.e., the mixture is stirrable at ambient temperatures. Examples of suitable polyepoxides are polyepoxides formed from an epihalohydrin such as, for example, epichlorohydrin and a polyhydric compound such as, for example, 2,2-bis(4-hydroxyphenyl) propane or glycerol.

The preparation of suitable polyepoxides is disclosed in U.S. 2,633,458, Shokal. Preferred polyepoxides are those designated polyether A, B, C, etc., but not limited thereto.

Liquid polyepoxides having an epoxy equivalency greater than 1.0 are preferably those having an epoxy equivalent weight between 150 and 350, e.g., between 170 and 290 and preferably an average molecular weight below 800, e.g., between 280 and 600. They also preferably have a functionality, i.e., ratio of molecular weight to epoxy equivalency, of at least 1.0 and preferably betwell 1.5 and 3.0. Especially preferred liquid polyepoxides are those designated polyether A and B in U.S. 2,633,458.

Solid polyepoxides having an epoxy equivalency greater than 1.0 are preferably those having an epoxy equivalent weight of between 400 and 4000, as, for example, between 450 and 525 or between 1650 and 2050. Solid polyepoxides having an average molecular weight above 500, e.g., between 800 and 1000, are also preferred. Suitable examples of preferable solid polyepoxides are those designated polyether C, D, E and F in U.S. 2,633,458. An other very suitable solid polyepoxide is a mixture of isomers and homologues of tetraglycidyl ether of tetraphenyl ethane.

An especially preferred polyepoxide for use in the present invention is the polyepoxide prepared by reacting epichlorohydrin with 2,2-bis(4-hydroxyphenyl)propane and which has an epoxy equivalent weight of between 175 and 210, an average molecular weight of between 350 and 400, and an OH equivalency of about 1250 such as polyether A. Another preferred polyepoxide is a mixture of polyether A and polyether B (a reaction product of epichlorohydrin and 2,2-bis(4-hydroxyphenyl)propane having an epoxy equivalent weight of between 225 and 290 and an average molecular weight of between 450 and 500).

The curing agents which are suitable for use in the present invention are the aliphatic and cycloaliphatic amines and the piperazines.

The aliphatic and cycloaliphatic amines which are reacted with the polyepoxide may be primary, secondary or tertiary amines.

Examples of suitable amines include the alkyl-substituted diamines; such as, for example, diethylene triamine; 2,4-diamino-2-methyl pentane; dimethylamino- and diethylamino-propylamine; propylene diamine; triethylene tetramine; amino ethyl ethanolamine; N(hydroxy ethyl) diethylene triamine; dimethyl diamino dicyclohexylamine; cyclohexyl propylene diamine. Mixtures of these amines may be used.

Preferred polyamines are those which are alicyclic or aliphatic in character and are composed of only carbon, hydrogen and nitrogen. Examples of the class are the alkylene diamines such as, for example, ethylene, propylene and butylene diamines and the polyalkylene polyamines. Of most importance, however, are the compounds wherein the polyamino group is a polyalkylenepolyamine group, having the formula

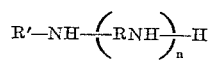

wherein R is an alkylene radical or a hydrocarbon radical-substituted alkylene radical, R' is an organic radical or hydrogein, and $n$ is an integer greater than one. Those compounds in which $n$ is an integer between 2 and 6 are especially preferred, and those wherein the polyamino group is a polyethylene polyamino group are particularly preferred. These polyamino groups have the formula

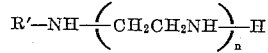

wherein R' is an organic radical or hydrogen, $n$ is an integer of between 2 and 6. Especially suitable are cycloaliphatic polyamines such as the cycloaliphatic diamines. Examples of such diamines are the alkylene diamine substituted cycloaliphatic hydrocarbons such as N-cyclohexyl-1,3-propane diamine, di(3-methyl-4-amino cyclohexyl)methane and a mixture of equimolar amounts of di(4-amino cyclohexyl)methane and N-cyclohexyl-1,3-propane diamine.

The piperazines, substituted or unsubstituted, that have an amino-substituted alkyl group attached to one of the ring nitrogen atoms, are suitable for use in the present invention. Preferred members are those of the formula:

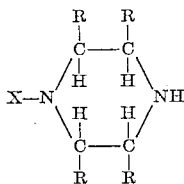

in which R is hydrogen or an alkyl radical or alkoxy radical and X is an amino-substituted alkyl radical. Examples of these compounds, include, among others, N-aminobutylpiperazine, N-aminoisopropyl-3-butoxypiperazine, N-aminoisopropylpiperazine, 2,5 - dibutyl-N-aminoethylpiperazine, N-aminoisopropylpiperazine, 2,5-dibutyl-N-aminoethylpiperazine, and 2,5 - dioctyl-N-aminobutylpiperazine. The preferred piperazine is N-aminoethylpiperazine. Mixtures of piperazines may also be used.

If desired, a mixture of an aliphatic amine and a piperazine may be used.

The polyepoxide is reacted with the aliphatic amine or piperazine under conditions so that the rise in temperature is not more than 10° C., and preferably not more than 5° C. When reacting the polyepoxide with cycloaliphatic amines, there is generally no exotherm and no special precautions are necessary. When reacting the polyepoxide with a piperazine, e.g., N-amino ethyl piperazine, an exotherm will develop unless prevented. In such cases the mixture should be cooled, preferably to a temperature below 5° C., to prevent an exotherm developing or to minimize the exotherm. The preferred temperature of reaction is between 10° C. and 20° C. The polyepoxide and aliphatic amine or piperazine are preferably reacted by mixing at slow speeds, such as by hand stirring or by using a slow speed paddle mixer, otherwise there is a possibility of two much heat being evolved. This technique of reacting a polyepoxide with aliphatic amine or piperazine but not to complete cure results in a "partially reacted product."

A particularly preferred method of reacting the polyepoxide with curing agent, e.g., a piperazine such as N-amino ethyl piperazine, is to mix the reactants together with stirring, to place the mixture in a shallow tray, and to allow the mixture to remain in a cooled chamber at a temperature, for example, of below 5° C., for a period of at least 6 hours, say, overnight. The product is then allowed to remain at ambient temperature for at least 24 hours, the exact period being commensurate with the temperature, i.e., the period being longer at lower ambient temperatures. The product is usually a friable solid and can be suitably powdered for use in the fluidized bed technique. If stored for any length of time, i.e., for more than one week, it should be kept at low temperatures, say below about 5° C.

The amount of aliphatic amine or piperazine which is mixed with polyepoxide is at least 0.6 times and preferably between 0.8 and 1.5 times the stoichiometric amount, and most preferably about 1.1 times the stoichiometric amount.

If desired, a pigment or filler may be incorporated with the polyepoxide and curing agent mixture. When pigments or fillers are included in a protective coating composition which is liquid at some state, it is preferable if the pigment or filler is thoroughly wetted by the film-forming vehicle of the composition so that the film is uniform in appearance. It is preferable, therefore, if the pigment or filler is incorporated with the liquid polyepoxide in, for example, a two-blade mixer or rubber mill before adding the curing agent or ground in a mill with the liquid portion before mixing with the remainder of the polyepoxide and curing agent. Examples of suitable fillers are barytes mica, slate powder, silica flour, and suitable pigments or any chemically stable inorganic or organic pigment, such as $TiO_2$, phthalo cyanine-blue of green, iron oxide and cadmium red.

In carrying out the coating process of the invention, the article is preferably heated to a temperature of at least 80° C., and more preferably between 100° and 150° C., before it is dipped into the fluidized bed. If the article is to be completely coated, it should of course be completely immersed in the fluidized bed. The article is preferably moved backwards and forwards in the bed, over a period of time determined by the desired thickness of coating. For the production of thin coatings, i.e., less than 0.015 inch thick, the period during which the article is dipped or immersed into the bed is usually less than 3 seconds.

After the article has been in contact with the fluidized bed for the desired time, it is removed, excess powder adhering to the article is preferably removed as by blowing with air or by shaking, and the coating cured by heating it, preferably to at least 80° C., and more preferably between 80° C. and 150° C.

The fluidized bed usually consists of a mass of finely divided solid particles, i.e., "partially reacted" resin and optionally filler or pigment, maintained usually at ambient temperature in a dense turbulent condition by means of a gaseous stream continuously introduced into the fluidized bed.

In spraying the particles in the modified process of the invention, a compressed air spray gun may be used, or the particles may be sprayed electrostatically, i.e., by maintaining a difference in electrostatic charge between the particles and the article to be coated.

In a modified process, before being sprayed the article is preferably heated to at least 80° C., viz., between 100° C. and 150° C. The coated article is then cured by heating the coating, preferably to at least 80° C. and more preferably between 80° C. and 150° C.

In the coating processes of this invention, the time of curing varies inversely as the temperature of cure, e.g., for curing temperatures of 100° C. to 150° C. the curing times vary from 30 minutes to 3 minutes.

In either the coating process or the modified coating process of this invention, particles of relatively small size are preferred so that each small area of the surface to be coated contains a substantially uniform layer of adhering particles. The composition of the instant invention has an average particle size and a particle size distribution which produces or forms a stable fluidized bed. Suitable sizes are therefore between $6 \times 10^{-7}$ inches and $1.5 \times 10^{-2}$ inches in diameter. For electrostatic spraying the test sizes are less than $3 \times 10^{-3}$ inches in diameter. In the coating process of this invention it is usually preferable to have as nearly uniform particle sizes as possible because powder mixtures of relatively uniform sizes are most easily and most uniformly fluidized and give rise to the least amount of dust evolution.

The process or modified process of this invention can be used for coating many types of articles, in particular, those articles such as capacitors, which cannot be heated to temperatures above, say, 150° C.

Other articles which may be coated include articles of irregular or complex shape, e.g., hammers, bolts, pins, tubular sleeves, hooks, ventilators, screens, switches, electrical fitttings, protective caps or guards.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages are by weight.

Example I

This example illustrates the preparation of the novel coating compositions and their use in fluidized bed processes.

A mixture of 110 parts of polyether A and 140 parts of polyether B was mixed at ambient temperature with 60 parts of di(3-methyl-4-amino cyclohexyl)methane. The mixture was poured into trays to approximately a depth of one-quarter inch and allowed to set for 24 hours. The resulting brittle solid was then powdered in a grinding apparatus.

A fluidized bed of the resultant particles having an average size range of from about 50 to 300 microns was then maintained, and an article heated to 150° C. was dipped into the bed for 2 seconds. The article was then removed and any loose powder removed, and the coating was then cured by heating for 10 minutes at 150° C. A good hard coating was obtained.

Example II

Fifty parts polyether A, 50 parts of polyether B and 3 parts of aerosil were mixed together. To this mix 20 parts of N-amino ethyl piperazine was stirred in. The resulting mixture was placed in trays to a depth of about one-quarter inch and cooled to 5° C. for not less than six hours. The product was then allowed to stand at ambient temperature for 24 hours, whereupon a brittle solid formed. A fluidized bed was prepared as in Example I by grinding the resultant solid. An article immersed into the fluidized bed and cured as in Example I exhibited a good hard coating.

Example III

A solid prepared by the procedure of Example II except that some green pigment was incorporated therein was ground to particles of less than $1.4 \times 10^{-2}$ inch diameter. A fluidized bed of these particles was maintained, and miniature capacitors preheated to 150° C. were immersed for approximately 2 seconds. After removal from the bed, the coating was cured by heating it for 5 minutes at 140° C.

A good hard insulating coating was formed on each capacitor.

Example IV

The procedure of Example II was repeated wherein the curing agent employed is N-cyclohexyl 1,3-propane diamine; an equimolar mixture of di(4-amino cyclohexyl) methane and N-cyclohexyl-1,3-propane diamine; and N-aminobutylpiperazine. Good hard coatings are obtained in each instance.

Example V

One hundred parts of polyether A and 50 parts of polyether D are mixed with 25 parts of di(3-methyl-4-amino cyclohexyl) methane at ambient temperature. The mixture is poured into trays and allowed to set for 24 hours. A fluidized bed is then prepared as in Example I. An article preheated to 150° C. is then immersed into the bed for 2 seconds and then subsequently cured at 145° C. for 10 minutes. A good hard coating is obtained.

The compositions of the present invention may also be used advantageously as molding powders.

Thus, for compression or transfer molding, the new composition, preferably containing a pigment or filler, and preferably of particle size between 0.01 inch and 0.07 inch in diameter, is placed in the mold, e.g., a steel mold, the mold being closed, pressure being applied, and the mold being heated. During compression, at pressures preferably between 750 and 2000 lb./m.², the mold is usually heated to temperatures between 60° C. and 90° C. At these temperatures the polyepoxide-containing composition is cured to a handable product after periods ranging from 12 minutes to 7 minutes respectively; the longer the time, the lower the temperature. The product after removal from the mold may then be fully cured by heating in an oven.

Electrical components may be encapsulated quite readily by this method.

Example VI

A mixture of 100 parts by weight of polyether A, 30 parts by weight of di(3-methyl-4-amino cyclohexyl) methane, and 300 parts by weight of a treated chalk filler (OMYA-BLR) were mixed together at ambient temperature. The mixture was spread out to ¼″ depth in shallow trays and allowed to remain at about 23° C. for at least 16 hours. The product obtained as a friable solid, which was powdered to pass a mesh of about 14 holes to the inch (about 0.07 inch in diameter).

The powder was then placed in a steel cup-shaped mold, heated to between 70° and 75° C., and a pressure of 1000 lb./in.² applied for between 7 and 10 minutes. At the end of this period the molded article was removed from the mold, and was then suitable for post-curing by heating in an oven.

We claim as our invention:

1. A process for preparing a low-temperature curable, solid polyepoxide composition suitable for use in fluidized bed processes which comprises partially reacting at a temperature between 5° and 25° C., a polyepoxide having a vic-epoxy equivalency greater than 1.0 and which is a liquid above 15° C. with at least 0.6 times the stoichiometric amount of a curing agent selected from the group consisting of di(3-methyl-4-aminocyclohexyl)methane, N-cyclohexyl 1,3-propane diamine and a piperazine having the formula:

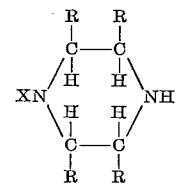

wherein R is selected from the group consisting of hydrogen, alkyl radicals and alkoxy radicals and X is an amino-substituted alkyl radical containing from 2 to 4 carbon atoms under conditions so that the rise in temperature during the reaction is not more than 10° C.

2. A process as in claim 1 wherein the polyepoxide is the reaction product of an epihalohydrin and 2,2-bis(4-hydroxyphenyl)propane having an epoxy equivalent weight between 150 and 350.

3. A process as in claim 1 wherein the polyepoxide is the reaction product of epichlorohydrin and 2,2-bis(4-hydroxyphenyl)propane having an epoxy equivalent weight between 175 and 210 and an average molecular weight between 350 and 400.

4. A process as in claim 1 wherein the piperazine is N-amino-ethyl piperazine and the temperature is less than 5° C.

5. A heat-curable fluidizable composition prepared by the process of claim 1 and having an average particle size between $6 \times 10^{-7}$ inches and $1.5 \times 10^{-2}$ inches.

References Cited by the Examiner
UNITED STATES PATENTS

| | | | |
|---|---|---|---|
| 2,965,609 | 12/1960 | Newey | 260—47 |
| 2,981,711 | 4/1961 | Meyer et al. | 260—47 |
| 3,102,043 | 8/1963 | Winthrop et al. | 260—47 |

WILLIAM R. SHORT, *Primary Examiner.*

SAMUEL BLECH, *Examiner.*

T. D. KERWIN, *Assistant Examiner.*